S. LÉ F. VARVEL.
RUBBER TIRE REPAIR VULCANIZER.
APPLICATION FILED SEPT. 7, 1917.

1,295,643.

Patented Feb. 25, 1919.

Inventor:
Sidney Lé Fevre Varvel

UNITED STATES PATENT OFFICE.

SIDNEY LÉ FÈVRE VARVEL, OF SYDNEY, NEW SOUTH WALES, AUSTRALIA, ASSIGNOR TO WILLIAM ARCHIBALD WINDEYER, REGINALD JAMES VINCENT, AND HUBERT JOHN DAVYS, ALL OF SYDNEY, AUSTRALIA.

RUBBER-TIRE-REPAIR VULCANIZER.

1,295,643.

Specification of Letters Patent.  Patented Feb. 25, 1919.

Application filed September 7, 1917.  Serial No. 190,268.

*To all whom it may concern:*

Be it known that I, SIDNEY LÉ FÈVRE VARVEL, subject of the King of Great Britain and Ireland, residing at 18 Bridge street, Sydney, New South Wales, Australia, have invented new and useful Improvements in Rubber-Tire-Repair Vulcanizers, of which the following is a specification.

My invention relates to apparatus for vulcanizing rubber tire and pneumatic tube repairs, and it consists in a vulcanizing plate within the body of which is incased an electrical heating device adapted to be supplied with electric current from a low voltage storage battery forming part of a car lighting starting or ignition system, as will be hereinafter particularly described.

The invention has been devised with the object of providing a vulcanizer of negligible weight and very small dimensions which can be carried conveniently and put into and out of service rapidly, and which will maintain a predetermined vulcanizing temperature on a patch or repair without necessity of attention or adjustment or control by thermostats or other accessory fittings. The apparatus is provided with certain attachments and is constructed in a shape which facilitates the making of tread repairs and the patching of tubes *in situ* or on a motor wheel.

Figure 6:
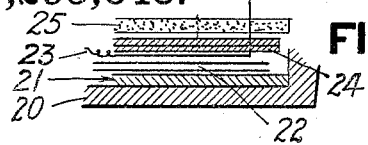
Figure 4:
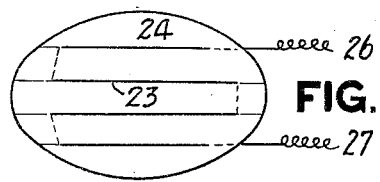
Figure 1:
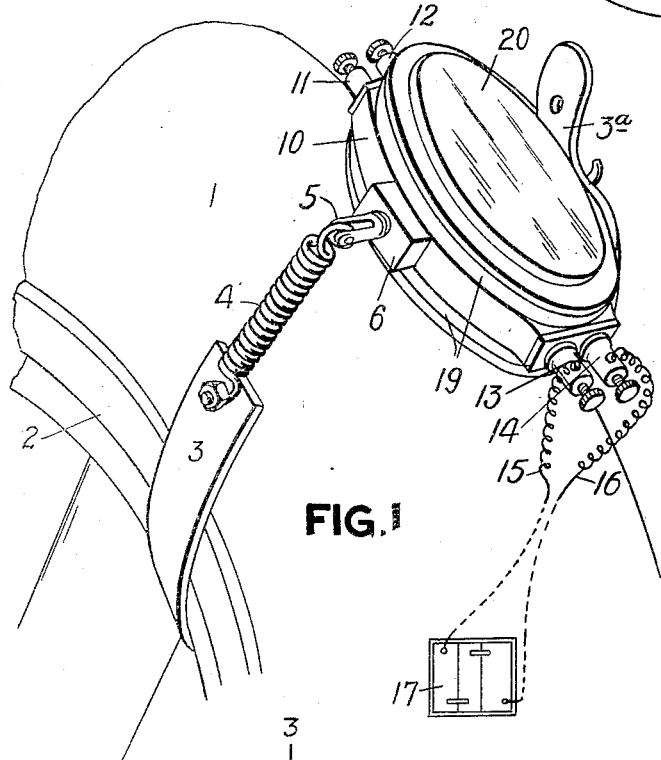
Figure 5:
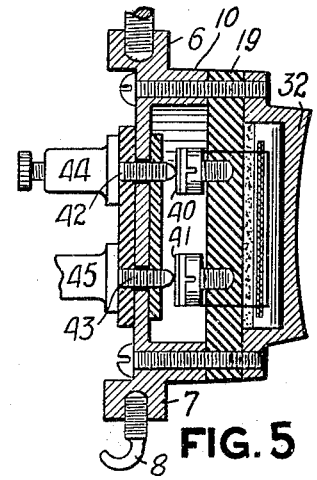
Figure 2:
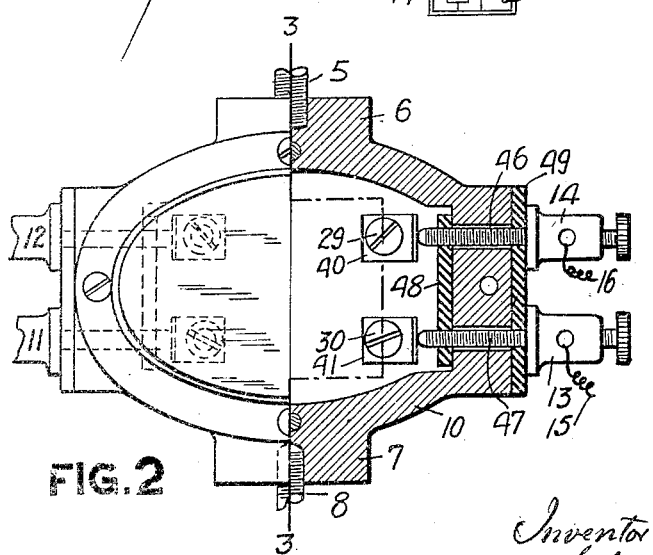
Figure 3:
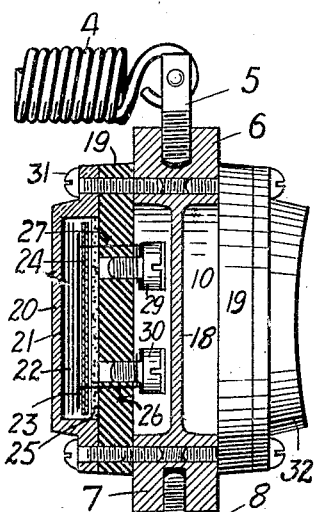

The invention is hereinafter described with reference to the annexed sheet of drawings, in which Figure 1 is a perspective view showing a portion of a pneumatic tired wheel with the vulcanizer set on the tire, as for the repair of a tread cut, by means of a spring clamp belt, and showing also diagrammatically electrical connections from the heater resistance wires in the vulcanizer to a 6-volt car battery; Fig. 2 is a halved plan and horizontal section of the vulcanizer; Fig. 3 is a transverse section through the vulcanizer, with one of the vulcanizing plates and its insulating backing shown in side elevation; Fig. 4 is a plan of the heater element, as it appears when removed from the vulcanizer; Fig. 5 is a transverse section through a modified form of the vulcanizer, as when it is made with only one vulcanizer plate instead of two vulcanizing plates as in Figs. 1, 2 and 3; and Fig. 6 is a fragment transverse section on an enlarged scale, showing the structure of the heater element and its bedding and backing.

Ordinarily, the vulcanizer is constructed with two vulcanizer plates, one on either side of it, one concaved and the other flat on the face, and separate heater elements for these plates and independent terminal connections for the battery wires, so that either element and its plate may be put in service as required. The heating capacity of the resistance wires is calculated with relation to the voltage of the storage battery current to insure maintenance of the correct vulcanizing temperature at the plate surface when the vulcanizer is set on a tire as shown in Fig. 1.

1 is the outer member or "cover" of a pneumatic tire, 2 the wheel rim, 3 a clamp strap, 4 a helical spring connecting the butt end of the strap 3 to a finger 5 projecting from the lug 6 which is integral with one side of the vulcanizer body 10. The other end 3ª of the strap 3 is perforated at intervals and so adapted to be engaged on the claw 8 on the body lug 7, which corresponds with the body lug 6 on the outer side of the vulcanizer body. 11—12 are terminal screws on one end of the body casting 10, and 13—14 are similar screws on the other end of that casting. These screws respectively form pairs adapted to be wired up as shown at 15—16 to a storage battery 17. The screws 11 and 12 are connected interiorly of the vulcanizer body with resistance wires embedded in the heater element associated with the vulcanizer plate 20, while the screws 13 and 14 are similarly connected up to the heater element associated with the plate 32. 19 are plates of bakelite, hard fiber, or similar heat and electrical insulating material interposed between the body casting 10 and the plates 20 and 32 respectively, said plates being secured to the body casting by screws 31. A septum 18 in the body casting of the double type of vulcanizer serves to separate the fitting on one side of said body from those on the other side of it. The vulcanizer plates are preferably constructed of copper which may be nickeled on the surface. Each plate is preferably backed with lead as shown at 21 and the heater units are set behind the lead backings. The heater units each consist of a mica sheet 24 through which resistance wires 23 are sewn, for instance in the manner shown in Fig. 4, and led over the under face of same. Two cover pieces 22 of mica are set between the wires 23 and the lead backing 21. An asbestos backing sheet 25 is set on top of the mica plate 24. Instead of asbestos an insulating heat resisting cement such as "alundum" may be used. These several parts 22, 23, 24 and 25 are compacted between the insulating plates 19 and the lead backings 21 on the inner side of the vulcanizing plates, and are located and secured tightly together when the screws 31 are driven home. The wire ends 26 and 27 are wound around the contact screws 29 and 30 which are embedded in the insulating plate 19. Contact springs 40 and 41 are also secured by the screws 29 and 30, and these contact springs are engaged by the ends of the binding studs 46 and 47 on the terminals 11, 12, 13 and 14 respectively. The studs 46 and 47 are thimbled or have a clearance as shown so that they do not establish an electrical contact with the metallic body portion 10 of the vulcanizer. They are mounted externally on a face insulating plate 49 and internally are screwed through the insulating plate 48. When an electric circuit is established through the terminals 11—12, or 13—14 as the case may be, the current passing the wires 23 produces heating effects therein proportionate to the current flowing, so that after a few moments the temperature of the plate attains the point necessary for effective vulcanization and said plate is thereafter retained approximately at that temperature as long as current flows through the circuit from the battery 17.

The hollow faced plate 32 is provided for the purpose of making a contact over a relatively large area, that is to say a repair up to about 2 inches in length, whereas the flat pad is used for punctures and smaller repairs. It is convenient to fit the vulcanizer with the two faces so as to facilitate vulcanizing work, but where a flat face or a concave face only is required, the vulcanizer may be constructed single sided as in Fig. 5, with one face only; in that case the binding screws 44—45 for the battery circuit wires are located in the back of the vulcanizer instead of in the ends thereof as shown in Figs. 1 and 2.

A vulcanizer constructed according to this invention may be conveniently carried in the pocket and can be used for roadside repairs with a facility and rapidity quite impossible with any form of fire heated vulcanizer.

What I claim as my invention and desire to secure by Letters Patent is:—

A vulcanizer comprising a hollow body portion having lugs for attachment on opposite sides, an exchangeable flanged hollow vulcanizer plate of copper or the like provided with a lead backing, means holding said vulcanizer plate in position on said body portion, a heat insulating plate between the flange of said vulcanizer plate and said body portion, contact screws placed in said insulating plate, a heat resisting insulating carrier backed by heat insulating substance arranged in the hollow space of said vulcanizer plate, an electrical resistance wire supported by said insulating carrier, and having its ends connected to said contact screws, binding posts provided on the outside of said body portion, with a clearance around them, contact springs secured by said contact screws and forming the electrical connections from the said contact screws to the said binding posts, and an adjustable clamp strap adapted to be fastened to the lugs on the body portion.

In testimony whereof I have signed my name to this specification.

SIDNEY Lé FÈVRE VARVEL.

Witnesses:
H. C. CAMPBELL,
W. J. DAVIS.